No. 662,663. Patented Nov. 27, 1900.
E. H. BARTELS.
PLOW ATTACHMENT.
(Application filed Apr. 23, 1900.)
(No Model.)
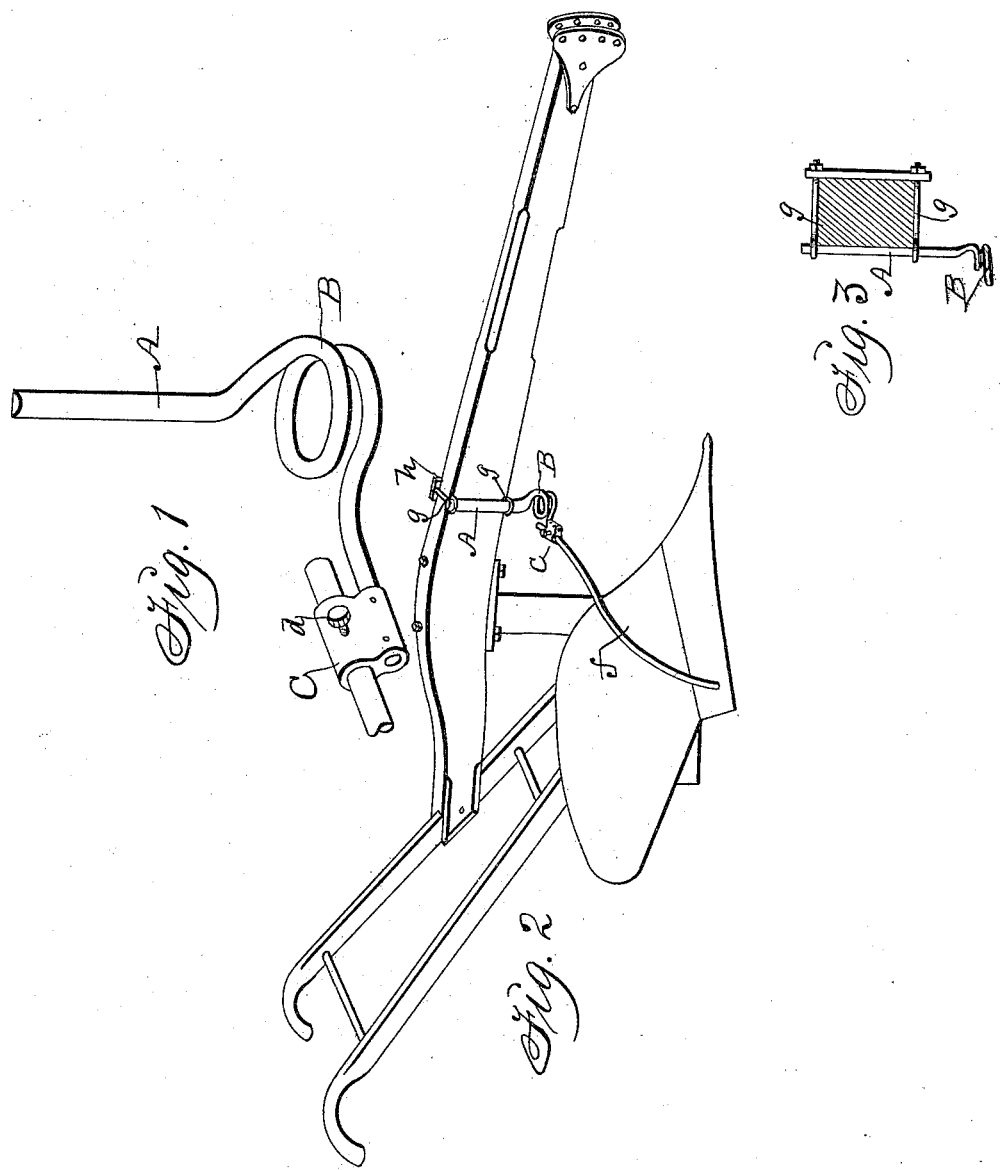
Witnesses:
R. G. Orwig
F. C. Stuart
Inventor: Ernest H. Bartels,
By Thomas G. Orwig, Attorney.

UNITED STATES PATENT OFFICE.

ERNEST H. BARTELS, OF ELMA, IOWA.

PLOW ATTACHMENT.

SPECIFICATION forming part of Letters Patent No. 662,663, dated November 27, 1900.

Application filed April 23, 1900. Serial No. 13,872. (No model.)

*To all whom it may concern:*

Be it known that I, ERNEST H. BARTELS, a citizen of the United States, residing at Elma, in the county of Howard and State of Iowa, have invented a new and useful Plow Attachment, of which the following is a specification.

My object is to provide a simple, strong, and durable device specially adapted to be detachably and adjustably fixed to a plow-beam to project horizontally in front of the moldboard of a plow to engage and turn down stubble, grass, and weeds, so that such vegetable matter will be covered by the furrow-slice as it is inverted while the plow is advanced.

My invention consists in the construction, arrangement, and combination of separable parts, as hereinafter set forth, pointed out in my claim, and illustrated in the accompanying drawings, in which—

Figure 1 is a perspective view of a rod-bearer that has an integral coiled spring at its bottom and a socket for a rod on the free end of the coiled spring. Fig. 2 is a perspective view of a plow, showing my attachment applied to the beam, as required for practical use. Fig. 3 is a transverse sectional view of the plow-beam, showing how the rod-bearer is detachably fastened to the beam.

The letter A designates the rigid and top portion of my rod-bearer, and B is a coiled spring at its bottom. The straight rigid part is semicircular in cross-section, so that the flat face is adapted to be clamped fast to the beam by means of eyebolts that encircle the rounded face, as shown in Figs. 2 and 3 and as required to be firmly fixed to the plow-beam.

C is a socket fixed to the free end of the coil B and provided with a screw-seat for a set-screw $d$. A rod $f$ is curved at one end portion, and its straight end portion is extended through the socket and detachably and adjustably fastened thereto by means of the set-screw.

To clamp the device to a plow-beam, I use two bolts $g$, having eyes or hooks at one end to engage the rounded side of the bearer A and a washer-plate $h$, that has holes in its end portions for the screw-threaded ends of the bolts and nuts on the ends of the bolts, as clearly shown in Fig. 3.

In practical use the rod $f$ can be readily adjusted relative to the width of a furrow in such a manner that as the plow is advanced the rod $f$, fixed to the end of the spring B, will be self-adjusting relative to the resistance it is subjected to by the stubble, grass, or weeds that are to be turned down and under the furrow-slice.

Having described the construction, application, and operation of my invention, its practical utility will be readily understood by persons familiar with the art to which it pertains, and

What I claim as new, and desire to secure by Letters Patent therefor, is—

A plow attachment for turning down stubble, consisting of a rod-bearer having its upper rigid and straight part flat on one side and its lower part coiled, a socket having a screw-seat fixed to the free end of the coiled part and a set-screw fitted in said seat and a rod fitted in the socket, to operate in the manner set forth for the purposes stated.

ERNEST H. BARTELS.

Witnesses:
 E. F. BARTELS,
 H. H. SCHNADT.